(12) United States Patent
Hsu et al.

(10) Patent No.: US 6,318,308 B1
(45) Date of Patent: Nov. 20, 2001

(54) INCREASED COMPRESSION RATIO DIESEL ENGINE ASSEMBLY FOR RETARDED FUEL INJECTION TIMING

(75) Inventors: Bertrand Dahung Hsu, San Jose, CA (US); Gong Chen, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/412,627

(22) Filed: Oct. 4, 1999

Related U.S. Application Data

(60) Provisional application No. 60/108,531, filed on Nov. 16, 1998.

(51) Int. Cl.[7] .......................................................... F02F 7/00
(52) U.S. Cl. .................................................................. 123/48 A
(58) Field of Search ........................... 123/193.6, 193.1, 123/193.3, 188.14, 188.8, 90.15, 193.5, 48 A, 501

(56) References Cited

U.S. PATENT DOCUMENTS

| | | | |
|---|---|---|---|
| 4,187,823 | * 2/1980 | Brown, Jr. ........................ | 123/188.14 |
| 4,660,383 | * 4/1987 | Leonard .............................. | 123/193.6 |
| 4,791,259 | * 12/1988 | Pfaffmann ......................... | 123/188.8 |
| 4,873,947 | * 10/1989 | Ryan, III et al. ................ | 123/188.14 |
| 5,363,820 | * 11/1994 | Neitz ................................... | 123/193.1 |
| 5,692,464 | * 12/1997 | Kimura .............................. | 123/90.15 |
| 5,868,112 | * 2/1999 | Mahakul et al. .................... | 123/263 |
| 5,873,341 | * 2/1999 | Smith, Jr. et al. ................. | 123/193.5 |
| 5,913,960 | * 6/1999 | Fletcher-Jones .................. | 123/193.4 |

* cited by examiner

Primary Examiner—Henry C. Yuen
Assistant Examiner—Hyder Ali
(74) Attorney, Agent, or Firm—Carl A. Rowold; Gerald W. Spinks

(57) ABSTRACT

A diesel engine adapted for operation under retarded fuel ignition timing relative to conventional fuel injection timing includes a piston shaped to increase the compression ratio of an engine cylinder, and specially designed combustion air intake and exhaust gas ports that increase scavenging flow of exhaust gases and allow for manipulation of air intake and exhaust gas valves with a cam shaft. Thus, an engine may be operated under retarded fuel injection timing to decrease emissions of nitrogen oxides without sacrificing engine performance and efficiency.

16 Claims, 4 Drawing Sheets

INCREASED COMPRESSION RATIO DIESEL ENGINE ASSEMBLY FOR RETARDED FUEL INJECTION TIMING

CROSS REFERENCE TO RELATED APPLICATIONS

This application claims the benefit of U.S. provisional application No. 60/108,531, filed Nov. 16, 1998.

BACKGROUND OF THE INVENTION

This invention relates generally to diesel engines and, more particularly, to medium speed diesel engines operated with retarded fuel injection timing relative to conventional fuel injection timing.

In a diesel engine, liquid fuel is injected into a plurality of engine cylinders full of compressed air at high temperature. The fuel is broken up into droplets, which evaporate and mix with the air in the cylinders to form a flammable mixture. Traditional concerns for diesel engine manufacturers include fuel efficiency and smokeless operation, both of which relate to the quality of combustion in the cylinders.

The generation of some engine exhaust emissions, including carbon monoxide (CO), particulate matters (PM), and smoke, is related to a large extent to the ending time of the fuel injection duration during each piston cycle. Generally speaking, the earlier the fuel injection duration ending time, the less smoke and PM are generated in the combustion cycle. In some applications of medium speed diesel engines, such as for diesel locomotive operation, fuel injection timing, i.e., the start of the fuel injection duration, is set early in the cycle for full load smokeless operation. By applying early fuel injection starting time, the fuel injection duration ending time also occurs earlier in the piston cycle, which reduces PM, CO and smoke emissions. However, early fuel injection timing increases engine cycle temperature. Consequently, exhaust emission of nitrogen oxides ($NO_x$) is relatively high.

One of the most effective ways to reduce emissions of $NO_x$, a major concern to diesel engine manufacturers, is to retard fuel injection timing relative to conventional fuel injection timing, which results in a later fuel injection duration ending time, which, in turn, causes incomplete and untimely combustion in the cylinders, reduces engine efficiency, and increases generation of CO, PM, and smoke. Moreover, retarded fuel injection timing lowers the firing pressure in the cylinders, which under-utilizes the structural capability of the engine.

Decreasing the fuel injection duration time, which results in an earlier fuel injection duration ending time, can alleviate CO, PM and smoke emissions despite retarded fuel injection timing. However, increased fuel consumption will still result due to low cycle efficiency associated with untimely combustion from the retarded fuel injection timing.

Accordingly, it would be desirable to provide a diesel engine for operation at retarded fuel injection timing to reduce the generation of $NO_x$ without compromising engine efficiency and without incurring reduced cylinder firing pressures, therefore more fully utilizing the structural capability of the engine, and curbing the generation of CO, PM and smoke emissions.

BRIEF SUMMARY OF THE INVENTION

In an exemplary embodiment of the invention, an engine block defines at least one cylinder and a cylinder head. A combustion air intake port and an exhaust gas port extend through said cylinder head for introducing combustion air into the cylinder head through a combustion air intake valve, and for expelling exhaust gases through an exhaust gas valve. A piston is slidably disposed in said cylinder and includes a specially shaped piston crown surface that reduces a clearance between the piston and the cylinder when the piston is at a top-dead-center position, thereby increasing the compression ratio of the engine. A valve cam shaft opens and closes the combustion air intake and exhaust valves within the specially designed combustion air intake and exhaust gas ports within the reduced valve-to-piston crown clearance. Therefore, collisions between the valves and the piston crown surface are avoided while scavenging flow of exhaust gases is enhanced.

More specifically, and in a particular embodiment, a piston crown surface has an outer edge, a depressed portion relative to the outer edge, and an elevated portion relative to the outer edge. The elevated portion is centered with respect to a longitudinal axis of the piston, with the crown surface depressed around the elevated portion. The piston crown surface reduces the clearance between the crown surface and the cylinder head when the piston is in the top-dead-center position, while the depressed portion facilitates a desired fuel injection jet flow behavior and combustion performance. The relative proportions of the convex elevated portion and the concave depressed portion are such that the compression ratio of the cylinder is increased by a specified amount to produce a higher cylinder firing pressure within allowable firing pressures that for which the cylinder was designed.

A specially designed combustion air intake port and exhaust gas port in the cylinder head include passages that decrease in cross-sectional area from the cylinder head through the ports and enhance scavenging flow of exhaust gases. The combustion air intake and exhaust gas ports also allow for combustion air intake valves and exhaust gas valves to be opened and closed with a valve cam shaft adapted for manipulating the valves without contacting the piston crown surface. In different embodiments, the passages are formed by a plurality of tapered bores, a plurality of bores with curved sidewalls, or a combination of tapered bores and bores with curved sidewalls.

The above described engine therefore allows for reduced emissions of $NO_x$ via operation with retarded fuel injection timing, while improving engine performance and efficiency and utilizing the full structural capability of the engine.

DETAILED DESCRIPTION OF THE INVENTION

Figure 1:
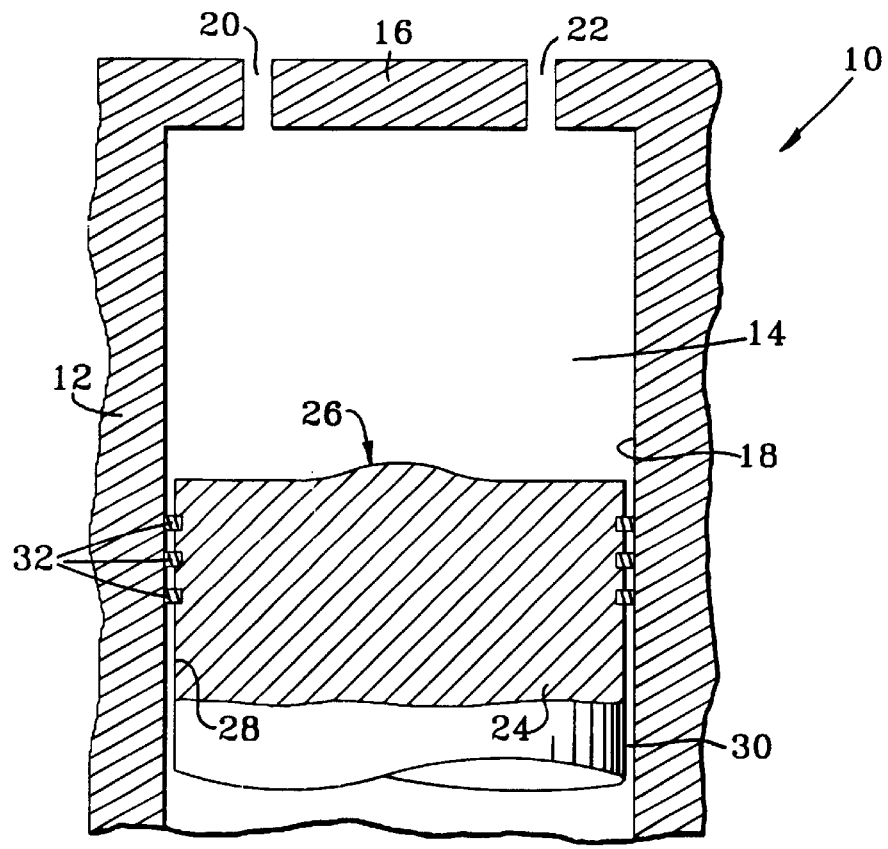
FIG. 1 is a simplified cross sectional view of a portion of a four stroke cycle diesel engine.

FIG. 1 is a cross sectional view of a portion of a four stroke cycle, medium speed diesel engine 10 such as a locomotive engine. Engine 10 includes an engine block 12 that defines a cylinder 14 including a cylinder head 16 and a circumferential wall surface or liner 18. A combustion air intake port 20 (described in detail below) and exhaust gas port 22 (also described in detail below) communicate through cylinder head 16 with cylinder 14. Cylinder head 16 also includes fuel injection ports (not shown) communicating with a fuel injector (not shown). While the present invention is described in the context of a locomotive, it is recognized that the benefits of the invention accrue to other applications of diesel engines. Therefore, this embodiment of the invention is intended solely for illustrative purposes and is in no way intended to limit the scope of application of the invention.

A piston 24 is slidingly disposed in cylinder 14 and includes a crown surface 26 adjacent cylinder head 16, and a circumferential sidewall surface 28 spaced from cylinder 14 by a predetermined clearance gap 30. Piston 24 includes a plurality of closely spaced, annular grooves (not shown), each of which is configured to receive an annular, split, compression ring seal 32 for establishing a compression seal between piston sidewall surface 28 and cylinder liner 18. Piston 24 is shown in a bottom-dead-center (BDC) stroke position in which piston crown surface 26 and cylinder head 16 are at their furthest relative distance. Piston 24 reciprocates inside cylinder 14 between BDC and a top-dead-center (TDC) stroke position in which piston crown surface 26 and cylinder head 16 are at their closest relative distance. Thus, cylinder 16 has a maximum working volume above piston crown surface 26 when piston 24 is at BDC, and a minimum working volume above piston crown surface 26 when piston is at TDC. The ratio of BDC volume to TDC volume is known as the compression ratio of cylinder 14.

In order to keep a cylinder 14 firing pressure within designed allowable structural limits of engine 10, the compression ratio of engine 10 is comparatively low relative to smaller diesel engines, and typically ranges from about 12 to about 14 in conventional medium speed diesel engines. However, as described in detail below, engine 10 operates with an increased compression ratio producing a peak firing pressure in cylinders 14 comparable to firing pressures at conventional fuel injection timing, i.e., non-retarded fuel injection timing. Consequently, engine 10 retains fuel efficiency despite fuel injection timing retardation. Thus engine 10 may be operated at retarded fuel injection timing to reduce the generation of NOX without compromising engine efficiency and without incurring reduced cylinder firing pressures, therefore more fully utilizing the structural capability of the engine, and curbing the generation of CO, PM and smoke emissions.

Figure 2:
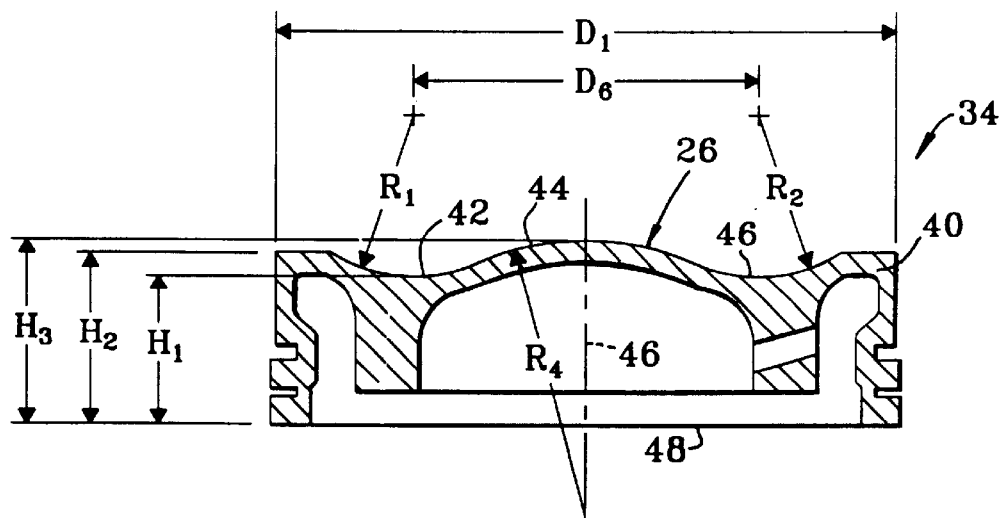
FIG. 2 is a cross sectional view of a piston crown for the piston shown in FIG. 1.

FIG. 2 is a cross sectional view of a piston crown 34 including piston crown surface 26 which increases the compression ratio of cylinder 14 (FIG. 1). Piston crown surface 26 includes a flat outer edge 40, a depressed portion 42 relative to outer edge 40 and extending from outer edge 40, and an elevated portion 44 centered with respect to a longitudinal axis 46 of piston 24. Piston crown surface 26 is curved, partly depressed and partly concave, with depressed portion 42 being generally concave and elevated portion 44 generally convex.

Depressed portion 42 extends a first distance $H_1$ above a bottom 48 of piston crown 34. Flat outer edge 40 extends a second distance $H_2$ above piston crown bottom 48. Elevated portion 44 extends a third distance $H_3$ above piston crown bottom 48. $H_1$, $H_2$, and $H_3$ are increasingly larger and are chosen to increase the compression ratio of cylinder (FIG. 1) by reducing the clearance volume between piston crown surface 26 and cylinder head 16 (FIG. 1) when piston crown surface 26 is in top-dead-center position. In alternative embodiments, $H_2$ and $H_3$ are equal in dimension, or $H_2$ is larger than $H_3$.

Piston crown surface 26 is further defined by an overall diameter D1, and the curvature defined by radiuses R1 and R2 that are separated by a distance D6, and a radius R4 measured from a center axis of piston 24. Distance D6 is approximately centered about center axis 24. With proper selection of H1, H2, H3, R1, R2, R4, D6 for a given D1, the compression ratio is raised a specified amount without exceeding a designed maximum allowable cylinder firing pressure when engine 10 is operated at retarded fuel injection timing. Also, H1, H2, H3, R1, R2, R4, and D6 are selected to achieve a desired fuel injection jet flow and combustion performance within cylinder 14 (FIG. 1) for a given D1.

In a particular embodiment, for example, the dimensions of piston crown surface for use in a medium speed diesel engine are as follows:

$D_1$=8.83 inches.
$H_1$=2.11 inches.
$H_2$=2.43 inches.
$H_3$=2.57 inches.
$R_1$=2.12 inches.
$R_2$=2.12 inches.
$R_4$=3.5 inches.
$D_6$=5.3 inches.

With some adjustment of these parameters, compression ratios of about 15 to about 17 can be realized in medium speed diesel engines.

Figure 3:
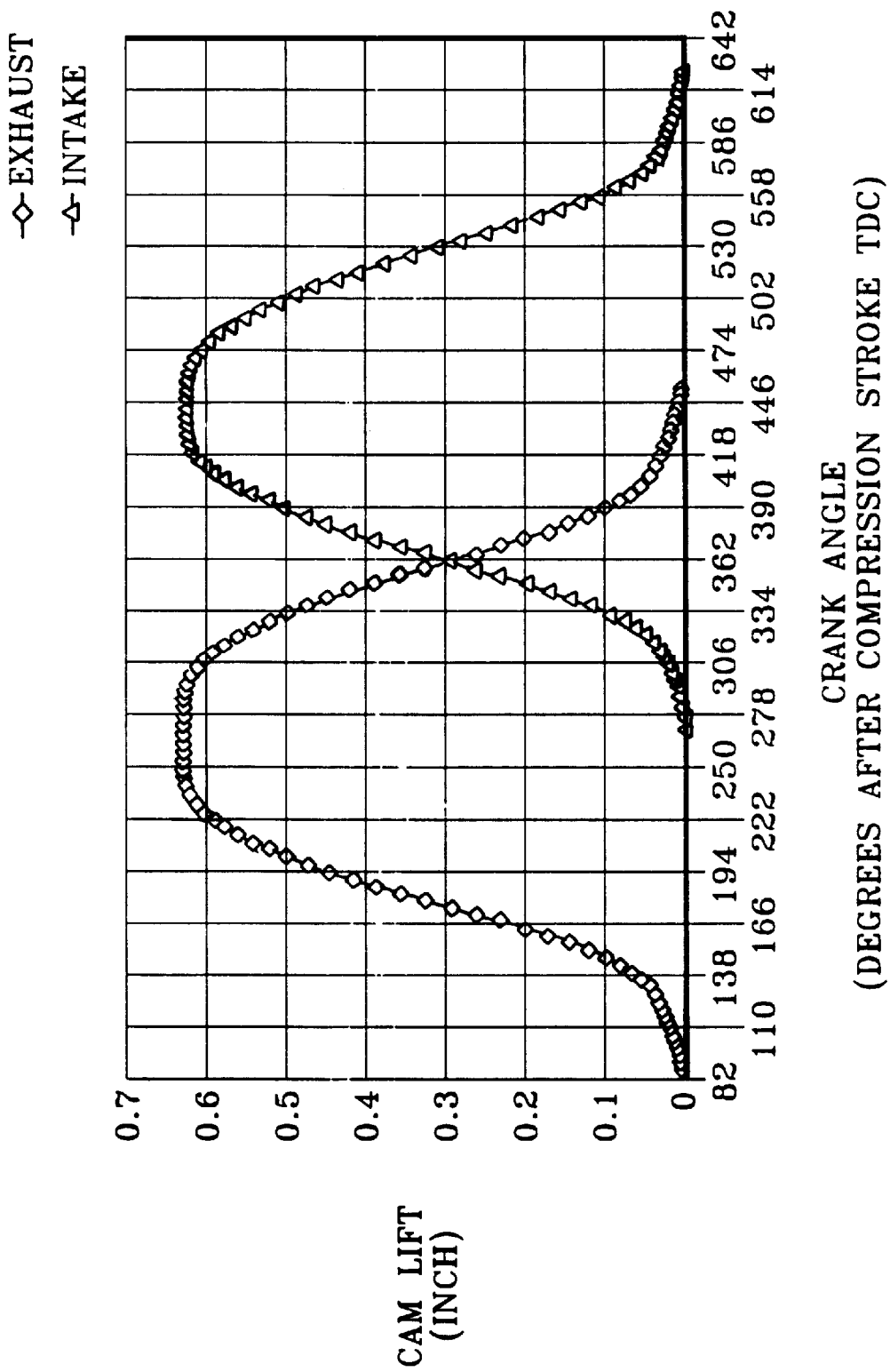
FIG. 3 is a valve cam shaft profile for a combustion air intake and exhaust gas valve for the engine shown in FIG. 1.

FIG. 3 illustrates a cam lift profile of a valve cam shaft (not shown) to open and close a combustion air intake valve (not shown) and an exhaust gas valve (not shown) located in combustion air intake port 20 and an exhaust gas port 22 (FIG. 1). As piston crown surface 26 (FIG. 2) reduces the relative clearance between piston crown surface 26 and cylinder head 16 (FIG. 1), the cam lift of the valve cam that actuates the valves is adjusted to accommodate the smaller piston-to-valve bumping clearance. Also, as seen in FIG. 3, the exhaust gas valve and intake valve cycles overlap, i.e., both valves are open simultaneously, to facilitate scavenging flow of exhaust gases. By actuating the valves with the valve cam, collision of piston crown surface 26 and the valves is avoided.

Figure 4:
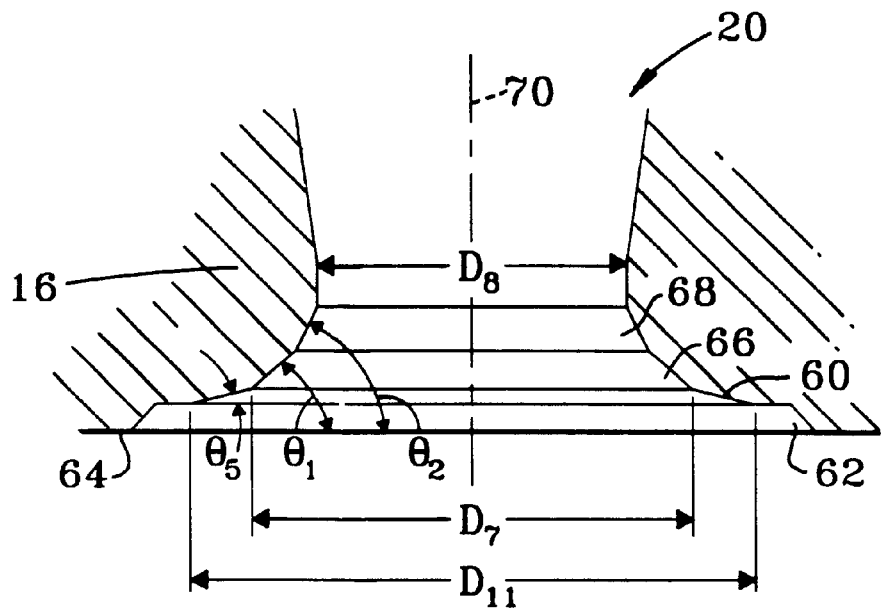
FIG. 4 is a cross sectional view of a combustion air intake valve port for the engine of FIG. 1.
Figure 5:
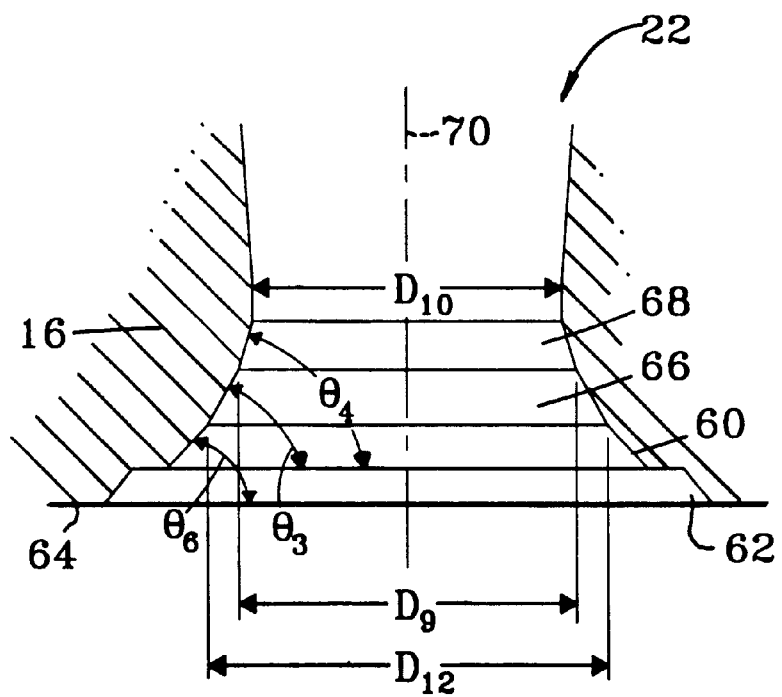
FIG. 5 is a cross sectional view of the exhaust gas valve port for the engine of FIG. 1.

FIGS. 4 and 5 illustrate cross-sectional views of a specially designed combustion air intake port 20 (FIG. 4) and an exhaust gas port 22 (FIG. 5) that enhance scavenging flow through the respective ports 20 and 22 in cylinder head 16 when piston 24 is used. Intake port 20 and exhaust gas port 22 each include a valve seat 60 for a respective intake valve (not shown) and an exhaust gas valve (not shown). A tapered bore 62 larger in cross section than valve seat 60 is positioned between an inside ceiling 64 of cylinder head 16 and provides additional clearance for the actuation of the valves as well as facilitating flow of air in and out of air intake and exhaust gas ports 20 and 22.

Specifically, and in a particular embodiment, each port 20, 22 also includes tapered bores 66 and 68 having diameters D7 and D8, respectively, in FIG. 4, and having diameters D9 and D10, respectively, in FIG. 5. Diameters D7, D8, D9, and D10 are less than the diameter of valve seats 60 (D11 in FIG. 4 and D12 in FIG. 5) and hence tapered bores 66 and 68 are generally smaller in cross sectional area than valve seat 60 and positioned on the opposite side of valve seat 60 than larger bore 62. Thus, moving through ports 20, 22 from the inside ceiling 64 of cylinder head 16, a passage through each port 20, 22 decreases in cross sectional area through bores 62, 66, 68 and valve seat 60.

Each tapered bore 66, 68 includes a transition angle $\theta_1$ and $\theta_2$, respectively, in FIG. 4 and $\theta_3$ and $\theta_4$, respectively, in FIG. 5 of the bore side wall measured relative to cylinder head ceiling 64 or from a substantially perpendicular plane to a port longitudinal axis 70. Valve seats 60 include angles $\theta_5$ and $\theta_6$, respectively in FIGS. 4 and 5. Comparing the exemplary embodiments of FIGS. 4 and 5, it is noted that transition angles $\theta_1$, $\theta_2$ in combustion air intake port 20 (FIG. 4) are not as large as the transition angles $\theta_3$, $\theta_4$ of the exhaust gas port 22 (FIG. 5). In alternative embodiments, values of $\theta_1$, $\theta_2$ may equal or exceed values of $\theta_3$, $\theta_4$, depending on the selected valve seat angles $\theta_5$, $\theta_6$.

In conjunction with valve seat angles $\theta_5$, $\theta_6$ of combustion air intake port 20 and exhaust has port 22, respectively, the respective transition angles $\theta_1$, $\theta_2$, $\theta_3$ and $\theta_4$ provide smooth transition in the cross sectional area of ports 20 and 22 to facilitate air flow. In an alternative embodiment, valve ports 20 and 22 include curved sidewalls in lieu of tapered bores to vary the cross sectional area of ports 20 and 22. In a further alternative embodiment, valve ports 20 and 22 include a combination of tapered bores and curved sidewalls.

In a particular embodiment, for example, the dimensions of the diameters and transition angles for a combustion air intake port and an exhaust gas port for a medium speed diesel engine are as follows.

$D_7$=2.4 inches.
$D_8$=2.28 inches.
$D_9$=2.37 inches.
$D_{10}$=2.28 inches.
$D_{11}$=2.51 inches.
$D_{12}$=2.52 inches.
$\theta_1$=40°
$\theta_2$=65°
$\theta_3$=60°
$\theta_4$=75°
$\theta_5$=15°
$\theta_6$=45°

With the above-described engine components, emissions reduction of fuel injected engines may be reduced and engine efficiency increased according to the following method.

Fuel injection timing is retarded relative to conventional fuel injection timing according to well known methods in the art to achieve a desired $NO_x$ emissions reduction. The resultant lower firing pressure, decreased fuel efficiency, and increased production of other exhaust emissions, such as CO, PM and smoke, are counteracted by an appropriately shaped and dimensioned piston crown surface 26. Piston crown surface 26 reduces the working cylinder volume when piston 24 is at TDC position, thereby increasing the compression ratio. The increase in the compression ratio is limited, however, by the designed maximum allowable firing pressure of cylinder 14. Thus, coupled with the retarded fuel injection timing, the compression ratio can be increased to compensate for the efficiency sacrifice and increased fuel consumption of retarded injection timing without exceeding the peak firing pressure of cylinder 14.

To further facilitate the performance of engine 10, the actuation of the combustion air intake and exhaust gas valves (not shown) are adjusted with a valve cam shaft (not shown) having a reduced cam lift (FIG. 3) during the valve overlap to avoid collision of the valves with piston crown surface 26. Scavenging flow is then enhanced by forming multiple tapered bores 62, 66, 68 in the combustion air intake and exhaust gas ports 20, 22, respectively. Therefore, by increasing the compression ratio of the engine with piston crown surface 26, decreasing the actuation of the valves (not shown) during overlap with a particular valve cam shaft (not shown), and enhancing the scavenging flow with special valve ports 20, 22, engine 10 can be operated more efficiently and with reduced emissions at retarded fuel injection timing to decrease the generation of nitrogen oxides to a desired level.

Figure 6:
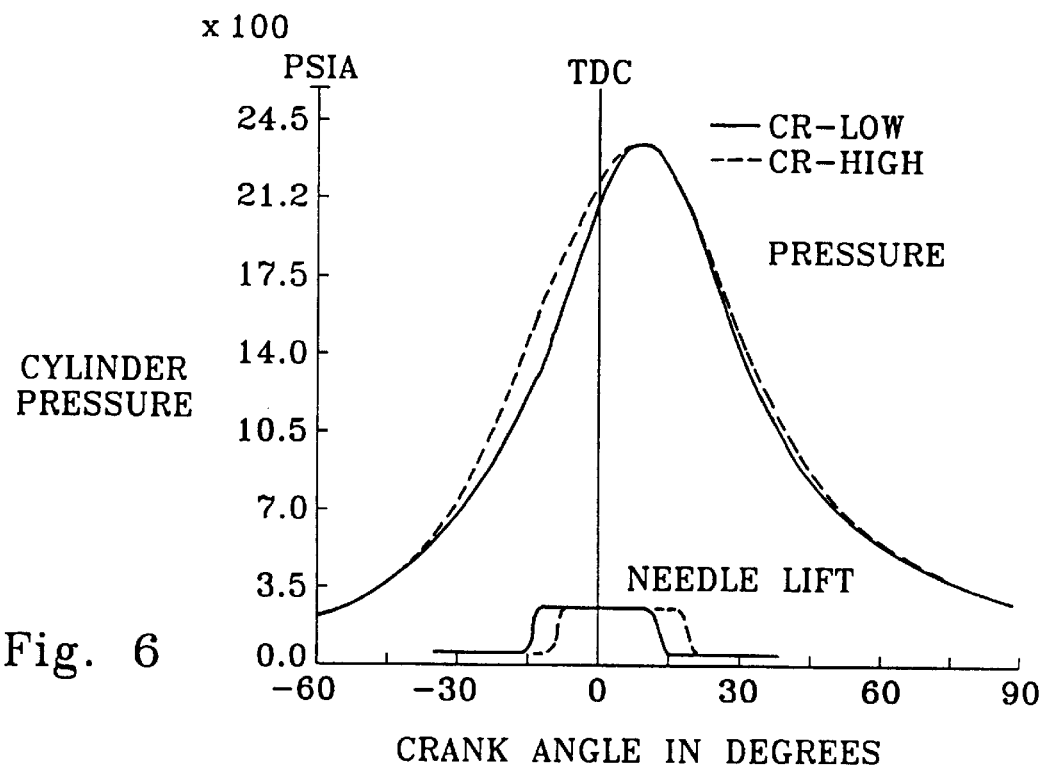
FIG. 6 is a graph comparing the cylinder pressure performance of the engine of FIG. 1 with a conventional engine.
Figure 7:
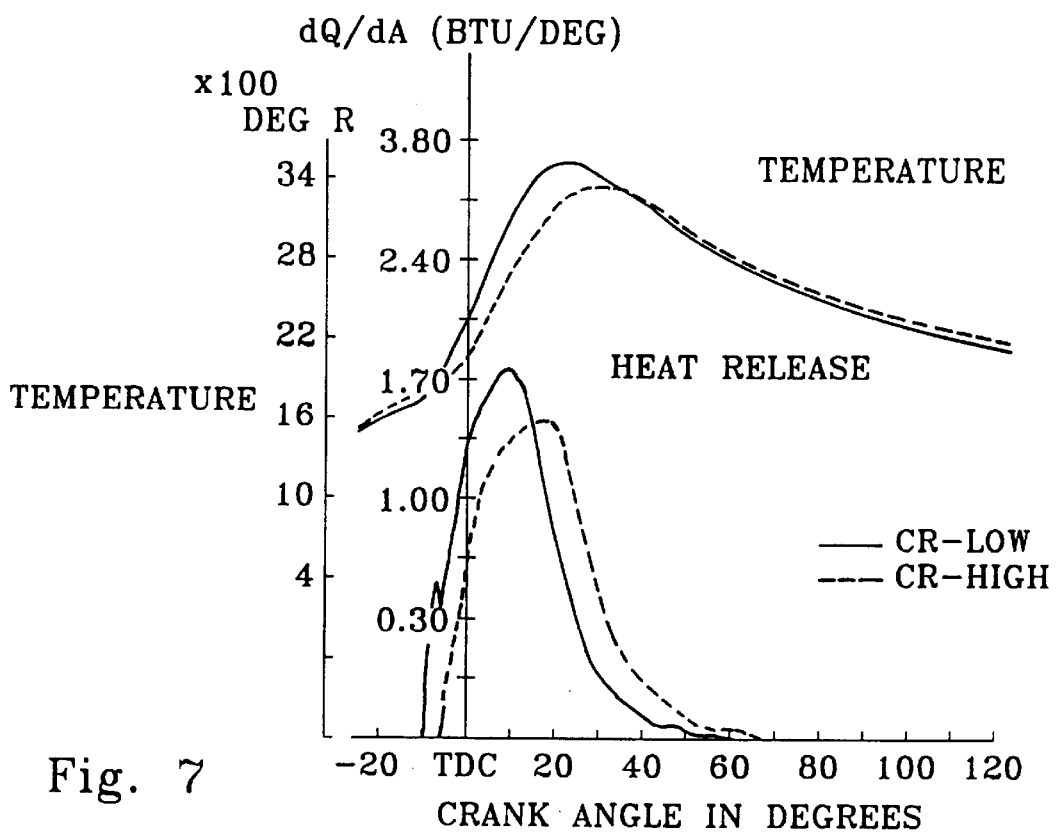
FIG. 7 is a graph comparing the heat release and temperature performance of the engine of FIG. 1 with a conventional engine.

FIGS. 6 and 7 illustrate the comparative performance of the retarded injection timing, higher compression ratio engine 10 described above to a conventional engine operating at a conventional injection timing, i.e., not retarded injection timing, at a conventional, i.e., not increased, compression ratio and operating at a full load or highest peak firing pressure. It is seen from FIG. 6 that the higher compression ratio engine may operate at retarded fuel injection timing while achieving approximately the same peak cylinder pressure as the conventional engine. It is further seen in FIG. 7 that the peak cycle temperature of the higher compression ratio engine at retarded fuel injection timing is somewhat lower than the peak temperature of the conventional engine.

Thus, by virtue of the above-described piston 24, together with above-described valve cam and intake and exhaust gas ports 20 and 22, an engine can be operated at reduced fuel injection timing advance with comparable or improved performance to the engine operated at conventional fuel injection timing. Thus, nitrogen oxides emission can be reduced without sacrificing engine performance.

While the invention has been described in terms of various specific embodiments, those skilled in the art will recognize that the invention can be practiced with modification within the spirit and scope of the claims.

What is claimed is:

1. A relatively large cylinder displacement volume, medium-speed compression ignition engine comprising:
   an engine block having at least one cylinder therein;
   a cylinder head covering the cylinder;
   a piston reciprocating in the cylinder between a top dead center position closely adjacent the cylinder head and a bottom dead center position spaced apart from the cylinder head;
   at least one combustion air intake port and at least one exhaust gas port extending through the cylinder head;
   the piston having a crown presenting a crown surface configured to reduce the clearance between the piston crown and the cylinder head when the piston is at its top dead center position for an increased compression ratio, the crown surface having a raised annular peripheral portion, a raised central portion and a recessed annular portion between the central and peripheral portions, with a generally smooth surface transition between the peripheral and recessed portions and between the recessed and central portions and a top of the raised central portion and a top of the raised peripheral portion being at generally the same level and the recessed portion presenting a generally shallow profile; and
   fuel injection for the injection of fuel at a timing relative to the position of the piston in the cylinder;
   with the engine having the midpoint of its fuel injection interval timed at a point after the top dead center position of the piston, which together with the increased compression ratio provides for reduced emissions of nitrogen oxides without loss of engine performance and efficiency.

2. The engine of claim 1 wherein the raised central portion projects up above the top of the peripheral raised portion.

3. The engine of claim 1 wherein the peripheral raised portion presents a generally planar surface.

4. The engine of claim 3 wherein the raised central portion is of generally convex shape in longitudinal central section of the piston.

5. The engine of claim 1 wherein the piston crown surface presents a generally smooth transition over the entire crown surface.

6. The engine of claim 1 wherein the recessed portion is generally concave in shape in longitudinal central section of the piston.

7. A relatively large cylinder displacement volume, medium-speed compression ignition engine comprising:

an engine block having at least one cylinder therein;

a cylinder head presenting a generally planar surface covering the cylinder;

a piston reciprocating in the cylinder between a top dead center position closely adjacent the cylinder head for providing an increased compression ratio, and a bottom dead center position spaced apart from the cylinder head;

at least one combustion air intake port extending up from an air intake valve seat and at least one exhaust gas port extending through the cylinder head;

at least one combustion air intake valve projecting down through the intake port and movable between a lowered position for opening the port for delivery of combustion air into the cylinder and a raised position in engagement with the air intake valve seat in the cylinder head for closing the port and defining in part the enclosed space of the cylinder;

at least one exhaust gas valve projecting down through the exhaust gas port and movable between a lowered position for discharge of exhaust gas from the cylinder and a raised position in engagement with the exhaust gas valve seat in the cylinder head for closing the port and defining in part the enclosed space of the cylinder with the distance of downward movement of the air intake valve and the exhaust gas valve into the cylinder being limited so as to avoid contact with the piston crown when the piston is adjacent top dead center; and with the surfaces of the valve ports extending up from their respective valve seats presenting generally smooth transitions to enhance the flow of intake air and exhaust gases into and out of the cylinder through the limited distance provided by the limited downward movement of the valves when the piston is adjacent top dead center.

8. The engine of claim 7 wherein each valve port surface comprises at least one surface of revolution.

9. The engine of claim 8 wherein the valve port surface comprises a series of frusto-conical tapered surfaces that transition from one frusto-conical surface to the adjacent frusto-conical surface.

10. The engine of claim 9 wherein the angle of the frusto-conical surfaces measured from the centerline of the port decreases from the valve seat into the cylinder head.

11. The engine of claim 7 wherein each valve port presents a generally smooth transition with the respective valve seat.

12. The engine of claim 7 wherein each port presents an inwardly converging, continuous curved surface extends up from the respective valve seat.

13. A relatively large cylinder displacement volume, medium-speed compression ignition engine comprising:

an engine block having at least one cylinder therein;

a cylinder head covering the cylinder;

a piston reciprocating in the cylinder between a top dead center position closely adjacent the cylinder head for providing an increased compression ratio, and a bottom dead center position spaced apart from the cylinder head;

at least one combustion air intake port and at least one exhaust gas port extending through the cylinder head;

a first valve cam operating through a cycle for moving a combustion air intake valve projecting down through the intake port between a lowered position for opening the port for delivery of combustion air to the cylinder and a raised portion in engagement with the cylinder head for closing the port and defining in part the enclosed space of the cylinder;

a second valve cam operating through a cycle for moving an exhaust gas valve projecting down through the exhaust gas port between a lowered position for opening the port for discharge of exhaust gas from the cylinder and a raised position for closing the port and defining in part the enclosed space of the cylinders;

the portion of the valve cycles during which the ports are open overlapping while the piston moves toward and away from top dead center;

with the valve cam moving the valves downward a limited distance toward the piston crown for partial opening of the respective ports during the valve overlap period to avoid contact of the valves and the piston crown when the piston is adjacent top dead center; and fuel injection for the injection of fuel at a timing relative to the position of the piston in the cylinder;

with the engine having the midpoint of its fuel injection interval timed at a point after the top dead center position of the piston, which together with the increased compression ratio provides for reduced emissions of nitrogen oxides without loss of engine performance and efficiency.

14. The engine of claim 13 wherein the engine is a four stroke engine and the crank angle during said overlap period is at least 100 degrees.

15. The engine of claim 13 wherein the change of the cam lift with respect to the change in crank angle increases as the piston approaches top dead center.

16. A relatively large cylinder displacement volume, medium-speed compression ignition engine comprising:

an engine block having at least one cylinder therein;

a cylinder head covering the cylinder;

a piston reciprocating in the cylinder between a top dead center position closely adjacent the cylinder head and a bottom dead center position spaced apart from the cylinder head;

at least one combustion air intake port and at least one exhaust gas port extending through the cylinder head;

the piston having a crown presenting a crown surface configured to reduce the clearance between the piston crown and the cylinder head when the piston is at its top dead center position for an increased compression ratio; and fuel injection for the injection of fuel at a timing relative to the position of the piston in the cylinder;

with the engine having the midpoint of its fuel injection interval timed at a point after the top dead center position of the piston, which together with the increased compression ratio provides for reduced emissions of nitrogen oxides without loss of engine performance and efficiency.

* * * * *